Nov. 5, 1963   R. F. BISHOP ET AL   3,109,551
LOAD SUPPORTING MEANS

Filed April 22, 1958   3 Sheets-Sheet 1

INVENTORS
Ronald F. Bishop
Frank Clifford

By *Holcomb, Wetherill & Brisbois*
ATTORNEYS

Nov. 5, 1963  R. F. BISHOP ET AL  3,109,551
LOAD SUPPORTING MEANS
Filed April 22, 1958  3 Sheets-Sheet 3

INVENTORS
Ronald Frank Bishop
BY Frank Clifford
Holcombe, Wetherill & Brisebois
ATTORNEYS 3,109,551
LOAD SUPPORTING MEANS
Ronald Frank Bishop and Frank Clifford, Darlington, England, assignors to Whessoe Limited, Darlington, England, a British company
Filed Apr. 22, 1958, Ser. No. 730,159
4 Claims. (Cl. 220—1)

This invention relates to vessels which are subjected in use to high internal pressures and/or temperatures and is concerned with means for supporting an internal structure within such a vessel in a manner which will accommodate the relative expansive and contractile movements of the vessel and of the internal structure resulting from such high temperatures and/or pressures.

In accordance with the invention an internal structure is supported within a closed vessel by a plurality of vertical columns spaced around the periphery of the structure, each column being capable of flexing radially of the vessel and the internal structure in response to a force which is small compared to that which can safely be withstood by the vessel and the internal structure, but being highly resistant to flexing in a direction which is tangential or circumferential with respect to said vessel and internal structure, so that relative expansion and contraction of the internal structure and the vessel are permitted, but bodily movement of the internal structure relative to the vessel is prevented.

This avoids transverse or bending stresses on any ducts or conduits which may extend through the walls of the vessel to supply the equipment carried by the platform. It also avoids any overstrain on certain of the supports due to an overload resulting from a shift in the weight supported by the platform.

More specifically, the invention comprises a closed vessel having an internal structure in the form of a substantially circular and horizontal load supporting platform which may be used to support a nuclear reactor or the like, disposed within and spaced from the shell of the vessel, the platform being supported from the lower part of the shell by a plurality of vertical columns distributed around the periphery of the platform, each column having a cross section whose radial dimension is small compared to its tangential dimension, so that horizontal expansion and contraction of the platform relative to the shell of the vessel is permitted by simultaneous outward or inward bending of all the columns, while the platform is held against a net horizontal movement as a whole in any one direction by the high resistance of each column to bending in a tangential direction.

Two forms of construction in accordance with the invention are shown by way of example in the accompanying drawing, in which FIGURE 1 is a vertical radial section through part of the wall of a vessel; FIGURE 2 is an elevation, looking from the right of FIGURE 1, of the internal parts shown in that figure; FIGURE 3 is a view, corresponding to part of FIGURE 1, showing an alternative construction; FIGURE 4 is a fragmentary section taken on the line IV—IV of FIGURE 3;

Figures 1, 3:
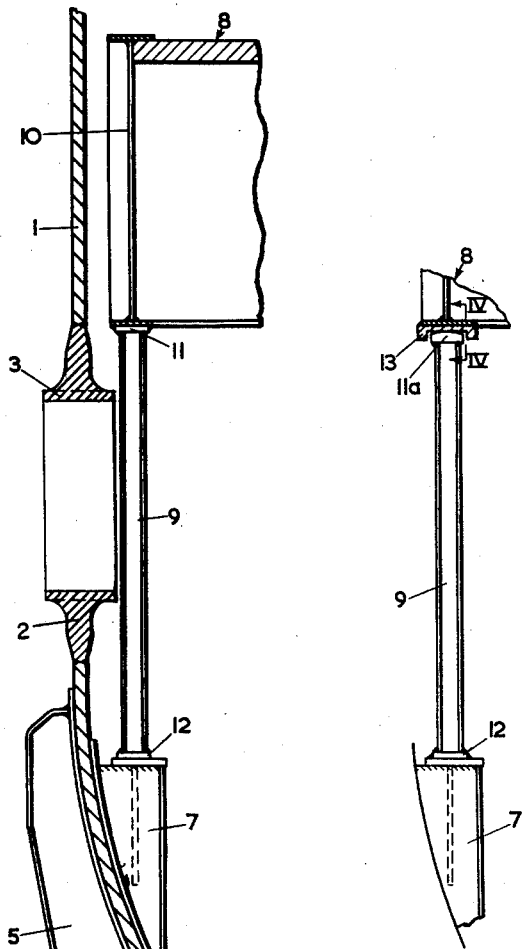

Referring first to FIGURES 1 and 2, the vessel illustrated has a vertical cylindrical wall 1 (the part shown including a thickened portion 2 through which passes a duct 3), a domed upper end (not shown) and a domed lower end 4. The vessel is supported in an elevated position by a plurality (for example, twenty) of brackets 5 secured externally to the shell of the vessel at equal intervals around its periphery and each bearing on the upper end of a rocking column 6. The column 6 has secured to its upper and lower ends cap plates 14, 15 whose top and bottom surfaces respectively are curved convexly and lie on the surface of an imaginary cylinder (indicated by the broken line 16) whose diameter is equal to the overall height of the column. The upper cap plate 14 engages the flat underside of bracket 5 and the lower cap plate 15 rests on the flat surface of a fixed foundation 17. The vessel is thus supported in an elevated position in a manner which allows the vessel to expand and contract freely, the columns 6 rocking in radial planes when such movements occur. Excessive relative movement between the cap plates and the flat surfaces with which they engage is prevented by block 18 secured to the flat surfaces. Directly above each of the brackets 5 is an internal bracket 7, which serves to support the internal structure and its load and to transmit a part of their weight to the corresponding supporting column 6 through the vessel wall and the bracket 5.

Within and spaced from the shell of the vessel is an internal structure in the form of a substantially circular and horizontal load carrying platform 8, some 40 feet in diameter. This platform is supported by a plurality of vertical columns 9, some nine feet in height, spaced around the periphery of the vessel at a short distance inside its wall. The lower end of each column is supported on the horizontal upper surface of one of the brackets 7, while the upper end of the column engages beneath a peripheral ring girder 10 bounding and forming part of the internal load supporting structure or platform 8. The columns 9 are rectangular in section, with a small radial dimension of six inches, and a two foot dimension in the tangential direction. Cap plates 11, 12 welded to the top and bottom ends of the column bear against the ring girder and the bracket respectively. The lower cap plate 12 is welded to the supporting bracket 7 and in the construction shown in FIGURES 1 and 2 the upper cap plate 11 is similarly secured rigidly to the ring girder, relative movement of the internal structure and the vessel being accommodated solely by bending movement of the columns.

Figure 4:
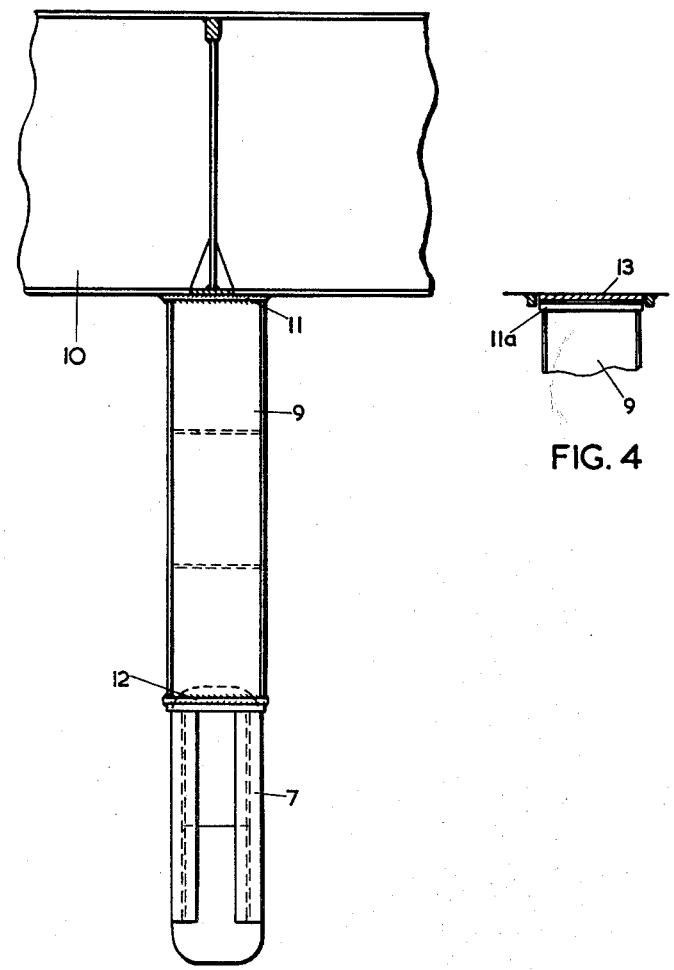
Figure 5:
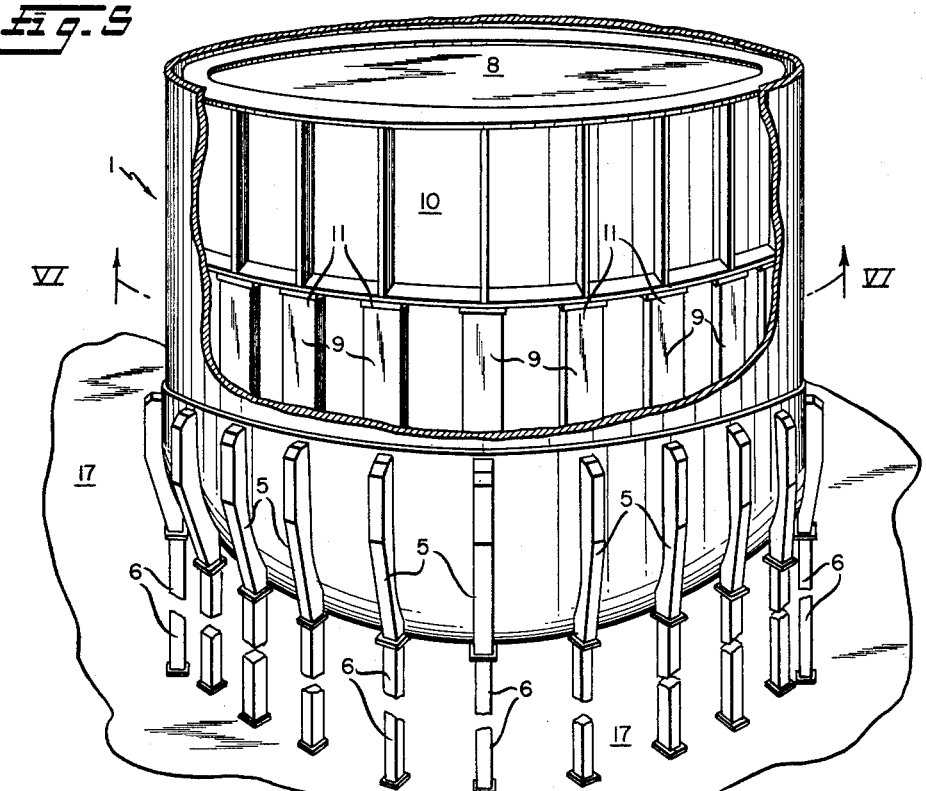
FIGURE 5 is a diagrammatic perspective view of the vessel of FIGURE 1, with the wall partly broken away.
Figure 6:
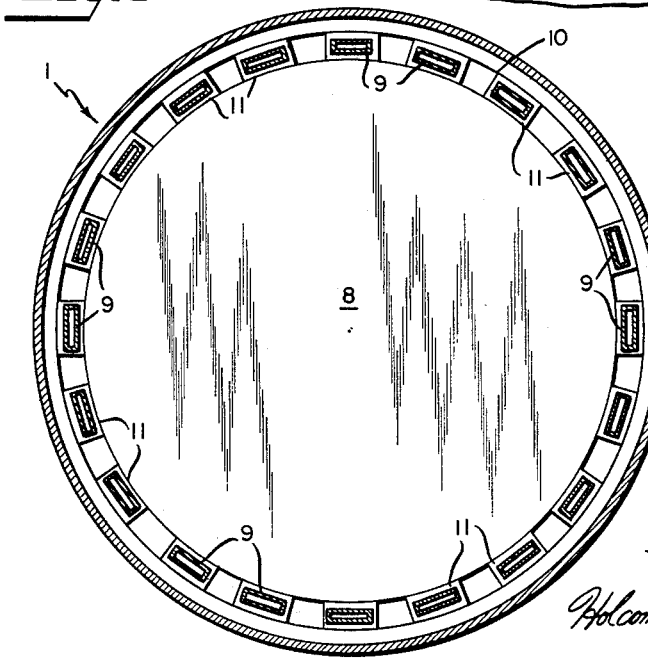
FIGURE 6 is a horizontal sectional view taken along the line VI—VI of FIGURE 5.
Figure 7:
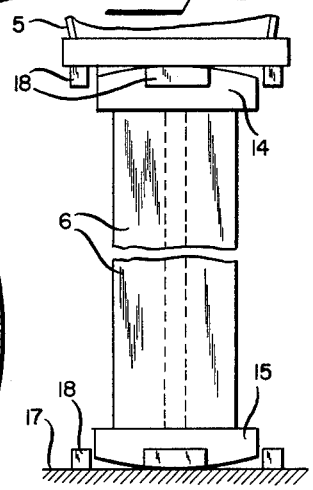
FIGURE 7 is an enlarged fragmentary view of one of the supporting columns illustrating the curved upper and lower cap plates.

In the alternative construction shown in FIGURES 3 and 4, the ring girder 10 is supported on the upper end of the columns 9 in a manner which allows relative angular movement in a radial plane between each column and the internal structure. The upper surface of the top cap plate 11a of the column is cylindrically curved about a radius equal to the height of the column, a recessed bearing plate 13 secured to the ring girder resting on the cap plate and making rolling contact therewith along a line directed tangentially to the vessel.

We claim:

1. A vessel comprising a symmetrical outer shell and having an internal structure in the form of a substantially circular and horizontal load supporting platform disposed within and spaced from the shell of the vessel with the vertical axis of said shell extending through the center of said platform, the platform being supported solely from the lower part of the shell by a plurality of closely spaced vertical columns symmetrically distributed around the periphery of the platform, each column being fixed at one end to said load supporting platform and at its other end to said shell and having a substantially uniform cross section throughout its length, the dimension of each column in a direction radial of the internal structure being small compared to its dimension in a direction which is tangential with respect to the periphery of said internal structure, so that horizontal expansion and contraction of the platform relative to the shell of the vessel is permitted by simultaneous outward or inward bending of all the columns, while the platform as a whole is held against net horizontal movement in any one direction relative to the vessel by the high resistance of each column to bending in said tangential direction.

2. A vessel in accordance with claim 1 in which the columns are rigidly secured at their lower ends to the shell of the vessel and at their upper ends to the internal structure.

3. A vessel in accordance with claim 1 in which the columns are rigidly secured at their lower ends to the shell of the vessel, while their upper ends engage the internal structure in a manner which allows relative angular movement in a radial plane between the column and the internal structure.

4. A vessel in accordance with claim 3 in which each column has its upper end surface cylindrically curved about a radius equal to the height of the column, the internal structure including a recessed bearing plate which rests on the end surface of the column and makes rolling contact therewith along a tangentially directed line.

References Cited in the file of this patent

UNITED STATES PATENTS

| | | |
|---|---|---|
| 2,018,976 | Shaler | Oct. 29, 1935 |
| 2,297,002 | Larson | Sept. 29, 1942 |
| 2,460,355 | Kornemann | Feb. 1, 1949 |
| 2,495,798 | Wissmiller | Jan. 31, 1950 |
| 2,706,575 | Soherr | Apr. 19, 1955 |